(12) United States Patent
Chikkappa

(10) Patent No.: US 10,718,851 B2
(45) Date of Patent: Jul. 21, 2020

(54) DISPLACEMENT AND ROTATION MEASUREMENT FOR UNMANNED AERIAL VEHICLES

(71) Applicant: QUALCOMM Incorporated, San Diego, CA (US)

(72) Inventor: Kiran Chikkappa, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 15/013,948

(22) Filed: Feb. 2, 2016

(65) Prior Publication Data
US 2017/0219685 A1    Aug. 3, 2017

(51) Int. Cl.
G01S 5/22 (2006.01)
G01S 5/18 (2006.01)
G01S 19/48 (2010.01)

(52) U.S. Cl.
CPC ............... *G01S 5/22* (2013.01); *G01S 5/18* (2013.01); *G01S 5/186* (2013.01); *G01S 19/48* (2013.01)

(58) Field of Classification Search
CPC .......... G01S 5/06; G01S 5/02; G01S 5/0236; H04W 4/02; G08G 5/0069; B64C 39/024; B64C 2201/00; B64C 2201/14; B64C 2201/141
See application file for complete search history.

(56) References Cited

U.S. PATENT DOCUMENTS

| | | | | |
|---|---|---|---|---|
| 2,535,048 A | * | 12/1950 | Adams | G01S 1/02 342/36 |
| 3,922,911 A | * | 12/1975 | Groves | A61B 8/06 73/861.25 |
| 3,964,308 A | * | 6/1976 | Scarpa | G01F 1/66 73/861.27 |
| 3,987,674 A | * | 10/1976 | Baumoel | G01F 1/66 73/861.28 |
| 6,674,687 B2 | * | 1/2004 | Zeitzew | G01S 7/52004 367/6 |
| 8,248,002 B2 | | 8/2012 | Van Endert | |

(Continued)

FOREIGN PATENT DOCUMENTS

WO    WO-2016101155 A1 *  6/2016  ........... B64C 39/024

OTHER PUBLICATIONS

Lorenz R.D., "Flight and Attitude Dynamics Measurements of an Instrumented Frisbee," Measurement Science and Technology, Institute of Physics Publishing, 2005, vol. 16, pp. 738-748.

(Continued)

*Primary Examiner* — Hovhannes Baghdasaryan
*Assistant Examiner* — Amie M N Dure
(74) *Attorney, Agent, or Firm* — Paradice and Li LLP

(57) ABSTRACT

Apparatuses and methods are described for determining displacement and/or rotation of a Unmanned Aerial Vehicle (UAV), including, but not limited to, determining a first Time of Flight (ToF) for audio signals transmitted by an audio transmitter of the UAV and received by a first audio receiver of the UAV while the UAV is in motion, determining a second ToF for the audio signals transmitted by the audio transmitter and received by a second audio receiver of the UAV while the UAV is in motion, and determining the displacement or the rotation of the UAV based, at least in part, on the first ToF and the second ToF.

30 Claims, 9 Drawing Sheets

(56) References Cited

U.S. PATENT DOCUMENTS

| | | | | |
|---|---|---|---|---|
| 8,918,209 B2* | 12/2014 | Rosenstein | ............ | G05D 1/0272 |
| | | | | 700/254 |
| 9,412,280 B1* | 8/2016 | Zwillinger | ............ | G08G 5/0069 |
| 9,980,247 B2* | 5/2018 | Shauh | ................ | H04W 72/005 |
| 9,980,257 B2* | 5/2018 | Chen | ................ | H04W 72/0413 |
| 9,980,271 B2* | 5/2018 | Soriaga | ............... | H04W 72/082 |
| 9,980,275 B2* | 5/2018 | Goel | ..................... | H04W 72/10 |
| 9,980,366 B2* | 5/2018 | Subramanian | ....... | H05K 1/0213 |
| 2003/0151541 A1* | 8/2003 | Oswald | ................ | G01S 13/931 |
| | | | | 342/70 |
| 2004/0118222 A1* | 6/2004 | Cornish | ............... | G01N 1/2252 |
| | | | | 73/863.22 |
| 2010/0005903 A1* | 1/2010 | Beavis | ................ | B67D 1/0036 |
| | | | | 73/861.47 |
| 2010/0204955 A1 | 8/2010 | Roche et al. | | |
| 2014/0029376 A1* | 1/2014 | Baliguet | ............. | G01V 1/3817 |
| | | | | 367/13 |
| 2015/0120094 A1 | 4/2015 | Kimchi et al. | | |
| 2015/0148988 A1* | 5/2015 | Fleck | .................. | G05D 1/0011 |
| | | | | 701/2 |
| 2015/0277440 A1* | 10/2015 | Kimchi | ................ | G08G 5/0078 |
| | | | | 701/26 |
| 2015/0314870 A1* | 11/2015 | Davies | .................. | G05D 1/102 |
| | | | | 701/3 |
| 2016/0336020 A1* | 11/2016 | Bradlow | ................. | G01S 19/49 |
| 2016/0376031 A1* | 12/2016 | Michalski | ................ | B64F 1/36 |
| | | | | 701/15 |
| 2017/0168481 A1* | 6/2017 | Flanigan | ............. | G05D 1/0022 |
| 2018/0063554 A1* | 3/2018 | Sham | ............... | H04N 21/41422 |
| 2018/0065759 A1* | 3/2018 | Michalski | ............. | G08G 5/025 |
| 2018/0095459 A1* | 4/2018 | Bachrach | ............ | G05D 1/0094 |
| 2018/0105270 A1* | 4/2018 | Xu | ....................... | H04R 1/1083 |
| 2020/0043348 A1* | 2/2020 | Ghosh | .................... | B64D 47/08 |
| 2020/0094411 A1* | 3/2020 | Tan | .......................... | B61J 99/00 |

OTHER PUBLICATIONS

Student Science, "Semi-autonomous UAV Control Using Ultrasonic Multilateration," Intel ISEF 2007 Finalist Profile, 2007, 1 page. Retrieved fromURL: https://apps2.societyforscience.org/abstracts/project.cfm?PID=EE045&Year=2007.

* cited by examiner

DISPLACEMENT AND ROTATION MEASUREMENT FOR UNMANNED AERIAL VEHICLES

BACKGROUND

A variety of Unmanned Aerial Vehicles (UAVs) have been developed, including Remote Control (RC) planes for the hobbyists, and more advanced "drones" or UAVs for other applications including commercial and military. UAV configurations, such as "quadcopter" or four-rotor configurations, have been developed for specific or general hobby, commercial, or military applications.

Controlled displacement and/or rotation of a UAV, while in flight, may allow precise UAV locating/positioning, stabilization of onboard sensors (e.g., camera sensors), ranging, odometry, indoor navigation, mapping, and the like. Generally, higher accuracy of the in-flight displacement and/or rotation of the UAV can correspond to improved functioning of other features of the UAV. Visual light cameras may perform feature detection and depth mapping, from which rotation and displacement of the UAV may be determined. However, sufficient lighting and consistency of features in the captured frames may be required for precision. Thus, low light conditions, occlusion, and dramatic scene changes may greatly impact precision of the visual techniques, and may lengthen calibration times. In addition, cameras can require high power and processing capabilities.

SUMMARY

Various embodiments relate to determining displacement and/or rotation of an Unmanned Aerial Vehicle (UAV) in motion based on measured Time of Flight (ToF) of audio signals. According to some embodiments, at least an audio transmitter and two or more audio receivers may be provided on different locations on the UAV. When the UAV is not in motion or hovering in place, baseline ToFs from the audio transmitter to each of the two or more audio receivers may be determined during calibration. Based on actual ToFs determined while the UAV is in motion and accounting for the calibration, the displacement and/or rotation of the UAV may be determined.

In various embodiments, a method for determining displacement and/or rotation of a UAV includes determining a first Time of Flight (ToF) for audio signals transmitted by an audio transmitter of the UAV and received by a first audio receiver of the UAV while the UAV is in motion, determining a second ToF for the audio signals transmitted by the audio transmitter and received by a second audio receiver of the UAV while the UAV is in motion, and determining the displacement or the rotation of the UAV based, at least in part, on the first ToF and the second ToF.

In some embodiments, the method further includes determining a first baseline ToF for audio signals transmitted by the audio transmitter and received by the first audio receiver while the UAV is stationary or hovering in place and determining a second baseline ToF for the audio signals transmitted by the audio transmitter and received by the second audio receiver while the UAV is stationary or hovering in place.

In some embodiments, the method further includes adjusting the first ToF based on the first baseline ToF and adjusting the second ToF based on the second baseline ToF.

In some embodiments, the displacement or the rotation of the UAV is determined based, at least in part, on one or both of comparing the first ToF with the first baseline ToF and comparing the second ToF with the second baseline ToF.

According to some embodiments, the displacement of the UAV is determined to be in a first direction in response to the first ToF being greater than the first baseline ToF. The first direction corresponds to the movement of the first audio receiver away from an original position of the audio transmitter. In some embodiments, the displacement of the UAV is determined to be in a second direction in response to the first ToF being less than the first baseline ToF. In some embodiments, the second direction corresponds to movement of the first audio receiver toward the original position of the audio transmitter.

According to various embodiments, the displacement of the UAV is determined to be in a first direction in response to the second ToF being greater than the second baseline ToF. The first direction corresponds to the movement of the second audio receiver away from an original position of the audio transmitter. In some embodiments, the displacement of the UAV is determined to be in a second direction in response to the second ToF being less than the second baseline ToF. The second direction corresponds to movement of the second audio receiver toward the original position of the audio transmitter.

In some embodiments, the method further includes determining the first ToF based on a generation timestamp corresponding to when the audio signals are transmitted by the audio transmitter and a first reception timestamp corresponding to when the audio signals are received by the first audio receiver and determining the second ToF based on the generation timestamp and a second reception timestamp corresponding to when the audio signals are received by the second audio receiver.

In some embodiments, the audio signals are transmitted with one or more of a particular frequency, amplitude, or audio signature.

In various embodiments, the method further includes determining the first reception timestamp by comparing the one or more of particular frequency, amplitude, or audio signature associated with the audio signals transmitted by the audio transmitter with one or more of frequency, amplitude, or audio signature associated with the audio signals received by the first audio receiver. In some embodiments, the method further includes determining the second reception timestamp by comparing the one or more of particular frequency, amplitude, or audio signature associated with the audio signals transmitted by the audio transmitter with one or more of frequency, amplitude, or audio signature associated with the audio signals received by the second audio receiver.

According to some embodiments, the audio signals are ultrasound signals.

In some embodiments, the first audio receiver and the second audio receiver are spaced apart on the UAV.

The method further includes arranging the audio transmitter on a first portion of the UAV, arranging the first audio receiver on a second portion of the UAV, and arranging the second audio receiver on a third portion of the UAV, wherein the first portion, the second portion, and the third portion of the UAV are separate portions of the UAV.

In some embodiments, the first audio receiver and the second audio receiver are equidistant from the audio transmitter.

In some embodiments, the first portion is a first arm of the UAV. The second portion is a second arm of the UAV. The third portion is a third arm of the UAV.

In some embodiments, the first arm is perpendicular to one or more of the first arm or the second arm.

According to various embodiments, a UAV configured to determine displacement and/or rotation of the UAV includes an audio transmitter, a first audio receiver, a second audio receiver, and a processor configured with processor-readable instructions such that, when executed, causes the processor to: determine a first ToF for audio signals transmitted by the audio transmitter and received by the first audio receiver while the UAV is in motion, determine a second ToF for the audio signals transmitted by the audio transmitter and received by the second audio receiver while the UAV is in motion, and determine the displacement or the rotation of the UAV based, at least in part, on the first ToF and the second ToF.

In some embodiments, the processor is further configured to determine a first baseline ToF for audio signals transmitted by the audio transmitter and received by the first audio receiver while the UAV is stationary or hovering in place, and determine a second baseline ToF for the audio signals transmitted by the audio transmitter and received by the second audio receiver while the UAV is stationary or hovering in place.

In some embodiments, the processor is further configured to adjust the first ToF based on the first baseline ToF and adjust the second ToF based on the second baseline ToF.

In some embodiments, the processor is configured to compare the first ToF with the first baseline ToF and compare the second ToF with the second baseline ToF.

In some embodiments, the displacement of the UAV is determined to be in a first direction in response to the first ToF being greater than the first baseline ToF. The first direction corresponds to the movement of the first audio receiver away from an original position of the audio transmitter. The displacement of the UAV is determined to be in a second direction in response to the first ToF being less than the first baseline ToF. The second direction corresponds to movement of the first audio receiver toward the original position of the audio transmitter.

In some embodiments, the displacement of the UAV is determined to be in a first direction in response to the second ToF being greater than the second baseline ToF. The first direction corresponds to the movement of the second audio receiver away from an original position of the audio transmitter. The displacement of the UAV is determined to be in a second direction in response to the second ToF being less than the second baseline ToF. The second direction corresponds to movement of the second audio receiver toward the original position of the audio transmitter.

In some embodiments, the processor is further configured to determine the first ToF based on a generation timestamp corresponding to when the audio signals are transmitted by the audio transmitter and a first reception timestamp corresponding to when the audio signals are received by the first audio receiver and determine the second ToF based on the generation timestamp and a second reception timestamp corresponding to when the audio signals are received by the second audio receiver.

In some embodiments, the processor is further configured to transmit the audio signals with one or more of a particular frequency, amplitude, or audio signature.

In some embodiments, the processor is further configured to determine the first reception timestamp by comparing the one or more of particular frequency, amplitude, or audio signature associated with the audio signals transmitted by the audio transmitter with one or more of frequency, amplitude, or audio signature associated with the audio signals received by the first audio receiver; and determine the second reception timestamp by comparing the one or more of particular frequency, amplitude, or audio signature associated with the audio signals transmitted by the audio transmitter with one or more of frequency, amplitude, or audio signature associated with the audio signals received by the second audio receiver.

In some embodiments, the audio signals are ultrasound signals.

In various embodiments, the first audio receiver and the second audio receiver are spaced apart on the UAV.

In some embodiments, the audio transmitter is arranged on a first portion of the UAV. The first audio receiver is arranged on a second portion of the UAV. The second audio receiver is arranged on a third portion of the UAV. The first portion, the second portion, and the third portion of the UAV are separate portions of the UAV.

In some embodiments, the first portion is a first arm of the UAV. The second portion is a second arm of the UAV. The third portion is a third arm of the UAV.

In some embodiments, a non-transitory computer-readable medium is described to contain processor-readable instructions such that, when executed, cause a processor of a UAV to perform a method for determining displacement and/or rotation of the UAV. The method includes determining a first ToF for audio signals transmitted by an audio transmitter of the UAV and received by a first audio receiver of the UAV when the UAV is in motion, determining a second ToF for the audio signals transmitted by the audio transmitter and received by a second audio receiver of the UAV when the UAV is in motion, and determining the displacement or the rotation of the UAV based, at least in part, on the first ToF and the second ToF.

In various embodiments, a UAV configured to determine displacement and/or rotation of the UAV includes means for transmitting audio signals, first means for receiving the audio signals, second means for receiving the audio signals, means for determining a first ToF for the audio signals transmitted by the means for transmitting the audio signals and received by the first means for receiving the audio signals while the UAV is in motion, means for determining a second ToF for the audio signals transmitted by the means for transmitting the audio signals and received by the second means for receiving the audio signals while the UAV is in motion, and means for determining the displacement or the rotation of the UAV based, at least in part, on the first ToF and the second ToF.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
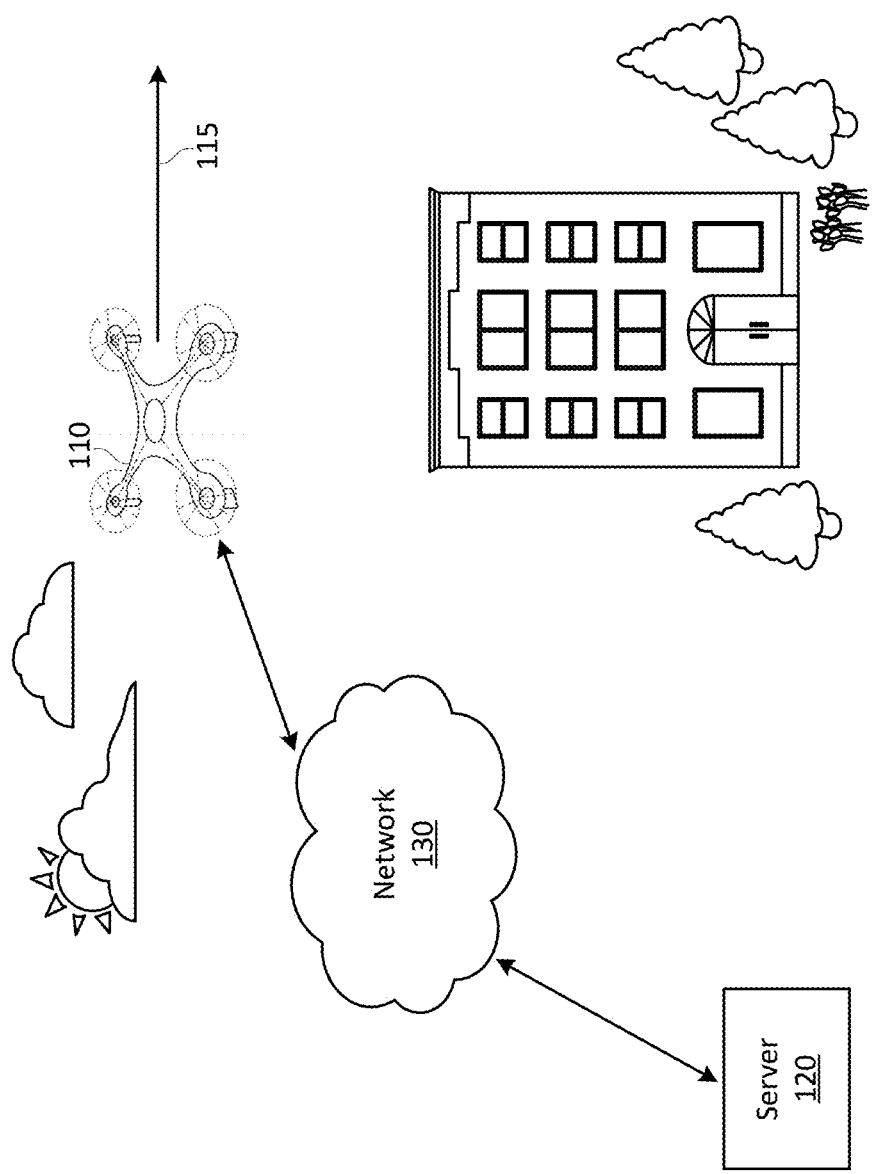
FIG. 1 is a diagram illustrating an example of a UAV having its displacement and/or rotation determined according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Embodiments relate to measuring displacement and/or rotation of a UAV using Time of Flight (ToF) of audio signals. In some embodiments, an audio transmitter (e.g., a speaker or ultrasound transmitter) may be provided on a first part of the UAV (e.g., a first arm or a tail). Two audio receivers (e.g., ultrasound receivers or microphones) may be provided on a second part (e.g., a second arm or a first wing) and a third part (e.g., a third arm or a second wing) of the UAV, respectively.

Illustrating with a non-limiting example, the audio transmitter may be provided on the first arm which aligns with a motion direction of the UAV. In such embodiments, the first arm may have a length dimension that extends along (or parallel to) a direction vector in the direction of motion (e.g., forward motion) of the UAV. The two audio receivers may be provided on separate arms (second and third arms) of the UAV. In particular embodiments, the second and third arms may be transverse to (such as, but not limited to, perpendicular to) the first arm. Given the configuration of the audio transmitter and receivers, the rotation and displacement of the UAV may be determined using the ToF of the audio signals originating from the audio transmitter, as received by the audio receivers.

For example, when the UAV is stationary (or hovering in place), a stationary ToF (calibrated baseline) may be determined, by determining a time differential between a generating time (as the audio transmitter outputs the audio signals) and a receiving time (as the audio receivers receive the same audio signals). The audio signals captured by the audio receivers may be identified based on one or more of frequency, amplitude, audio signatures (audio frequency and amplitude over time), or the like. The calibrated baseline ToFs may be stored. Then, at a later time, the two (or more) audio receivers may receive audio signals transmitted when the UAV moves in any direction. The received audio signals may be used to determine the current state of displacement and/or rotation of the UAV.

Depending on a velocity or angular velocity of the UAV, ToF of the audio signals received at each of the audio receivers may differ from the calibrated baseline ToFs. Generally, when the motion of the UAV shortens a distance for the audio signals to travel to reach an audio receiver, the ToF of the audio signals corresponding to the motion may be shorter than the baseline ToF with respect to the same audio receiver. On the other hand, when the motion of the UAV lengthens a distance for the audio signals to travel to reach an audio receiver, the ToF of the audio signals corresponding to the motion may be longer than the baseline ToF with respect to the same audio receiver. Given that the audio receivers may be provided at various different locations of the UAV, spatial relationships between the audio transmitter and each of the audio receivers may be known or determined. With the knowledge of the spatial relationships and the determined ToF of audio signals received at each of the audio receivers, the displacement and/or rotation of the UAV may be determined in the manner described.

Similar concepts may be applicable to determining the rotation of the UAV. For example, when the UAV rotates (or turns), distance from the audio transmitter to each of the audio receivers may be altered, thus resulting in differences with respect to the baseline ToFs. Accordingly, based on ToF corresponding to each of the audio receivers and the spatial relationship, the rotation of the UAV can be determined.

Additional audio transmitter(s) and/or audio receiver(s) may increase accuracy of the ToF techniques. The additional audio transmitter(s) and/or audio receiver(s) may be provided spaced apart. Each of the audio transmitters may output audio signals with one or more of different frequency, amplitude, and audio signatures such that the audio receivers can readily ascertain and distinguish an origin of the received audio signals to determine the ToFs associated with each audio transmitter.

FIG. 1 a diagram 100 illustrating an example of a UAV 110 having its displacement and/or rotation determined according to various embodiments. Referring to FIG. 1, the UAV 110 may be moving in a forward direction 115 with a particular velocity. The displacement of the UAV 110 may include a distance and a direction in which the UAV 110 has moved over time. In addition or alternatively, the UAV 110 may be rotating with an angular velocity. The rotation of the UAV 110 may include angular displacement of the UAV 110 over time. In some embodiments, the UAV 110 may itself determine its own displacement and/or rotation for positioning, stabilization of onboard sensors (e.g., camera sensors), ranging, odometry, indoor navigation, mapping, and/or the like. The UAV 110 may transmit the determined displacement and/or rotation to a server 120 via a network 130.

In other embodiments, the UAV 110 may transmit raw data (e.g., the ToFs received at each of a plurality of audio receivers) to the server 120 via the network 130. The server 120 may include suitable processing capabilities (e.g., a processor and a memory similar to ones described herein)

for determining the displacement and/or rotation of the UAV 110. The server 120 may send data related to the displacement and/or rotation of the UAV 110 via the network 130 to the UAV 110.

The server 120 may be any suitable wireless communication device, beacon, smartphone, tablet, or other devices having wireless communication capabilities to communicate with the UAV 110 via the network 130. The network 130 may implement any suitable protocol such as, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), Time Division Synchronous Code Division Multi Access (TD-SCDMA) and the like), Global System for Mobile Communications (GSM), Code Division Multiple Access 1× Radio Transmission Technology (1×), General Packet Radio Service (GPRS), Wi-Fi, Personal Communications Service (PCS), and/or other protocols that may be used in a wireless communications network or a data communications network.

The various embodiments of the UAV 110 may be suitable for implementation of the displacement and/or rotation determination apparatuses and methods. A flight power source for the UAV 110 may include one or more propellers that generate a lifting force sufficient to lift the UAV 110 (including the UAV structure, motors, rotors, electronics, and power source) and any loads attached thereto. The flight power source may be powered by an electrical power source such as a battery. Alternatively, the flight power source may be a fuel-controlled motor, such as one or more internal combustion motors. While the present disclosure is directed to examples of electric motor controlled UAVs, the concepts disclosed herein may be applied equally to UAVs powered by virtually any power source. Flight power sources may be vertical or horizontally mounted depending on the flight mode of the UAV 110.

An example UAV configuration in various embodiments is a "quad copter" configuration. In an example quad copter configuration, typically four (or more or fewer in other embodiments) horizontally configured rotary lift propellers and motors are fixed to a frame. In other examples, UAVs with different numbers, sizes, and shapes of rotors (propellers) may likewise be used. The frame may include a frame structure with landing skids that supports the propulsion motors, power source (e.g., battery), payload securing mechanism, or other structures or devices. A payload may be attached in a central area underneath the frame structure platform of the UAV 110, such as in an area enclosed by the frame structure and skids, beneath the flight power sources or propulsion units. The UAV 110 may fly in any unobstructed horizontal and vertical direction, or may hover in place. The UAV 110 may be configured with one or more processing devices that enable displacement and/or rotation determination in the manner described.

Figure 2A:
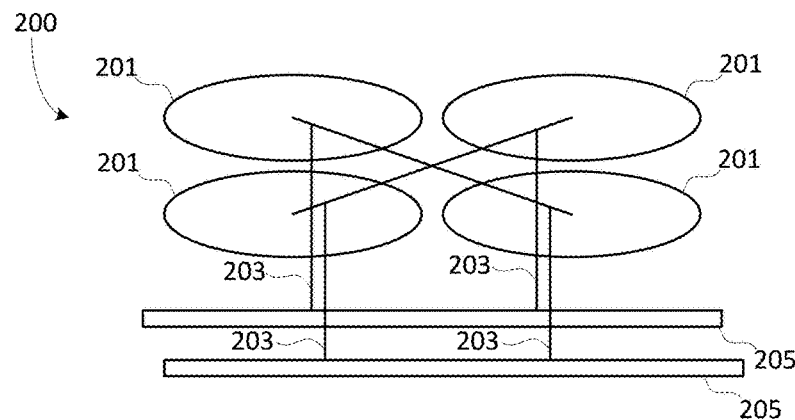
FIG. 2A is a schematic diagram illustrating an example of a UAV suitable to determine its displacement and/or rotation according to various embodiments.
Figure 2B:
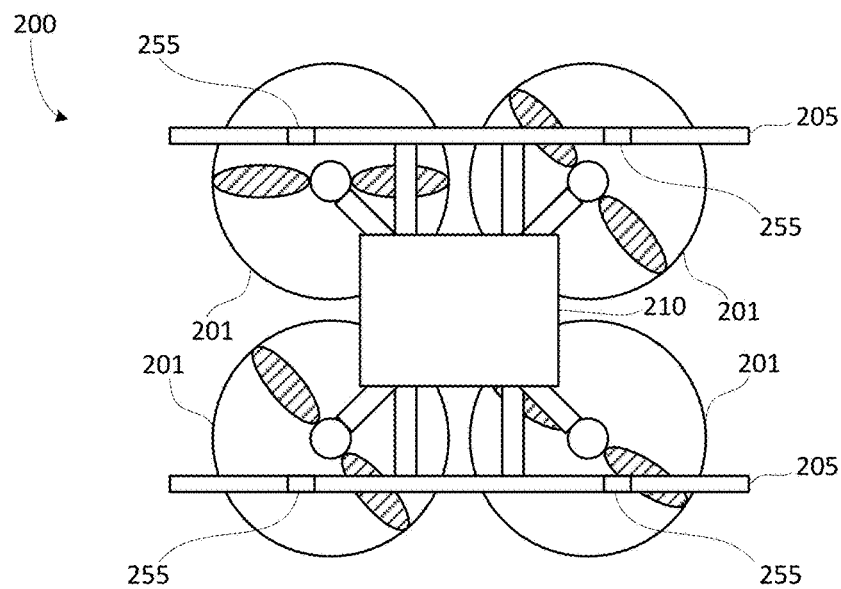
FIG. 2B is a schematic diagram illustrating an example of a UAV suitable to determine its displacement and/or rotation according to various embodiments.
Figure 2C:
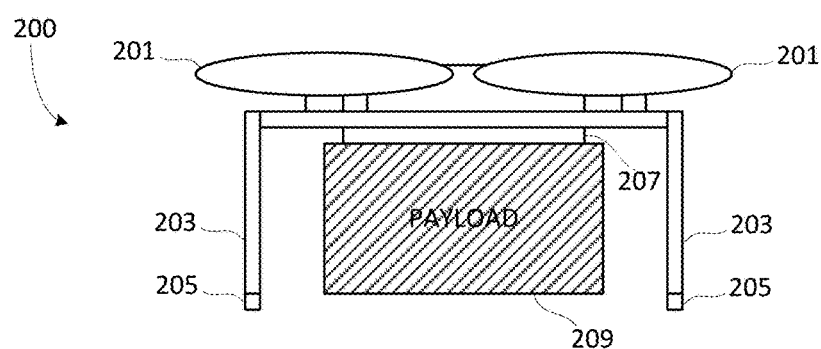
FIG. 2C is a schematic diagram illustrating an example of a UAV suitable to determine its displacement and/or rotation according to various embodiments.
Figure 2D:
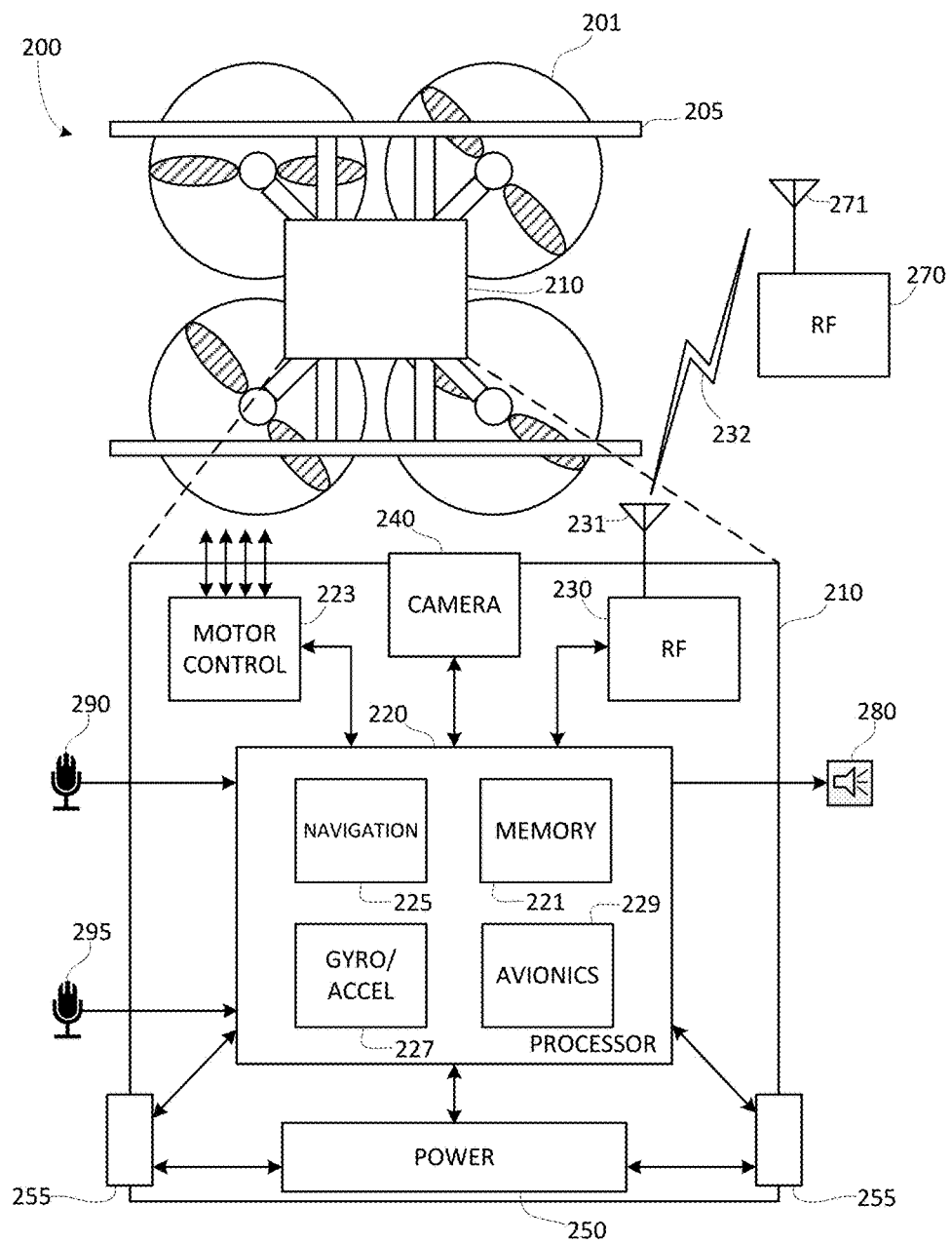
FIG. 2D is a schematic diagram illustrating an example of a UAV suitable to determine its displacement and/or rotation according to various embodiments.

Referring to FIGS. 1-2D, in some embodiment, the UAV 200 (which corresponds to the UAV 110) may include a plurality of rotors 201, a frame 203, and landing skids 205. In the illustrated embodiments, the UAV 200 has four rotors 201. However, in other embodiments, the UAV may have more or fewer than four rotors 201. The frame 203 may provide structural support for the motors associated with the rotors 201, and for the landing skids 205. The frame 203 may be sufficiently strong to support the maximum load weight for the combination of the components of the UAV 200 and, in some cases, a payload 209 (shown in FIG. 2C). While the UAV 200 is shown and described as having a frame 203 having a plurality of support members or frame structures, the UAV 200 may be constructed with a unitary frame structure for example, but not limited to, a molded frame in which support for multiple rotors is provided by a single, unitary, molded structure.

In some embodiments, the landing skids 205 of the UAV 200 may be provided with landing sensors 255. The landing sensors 255 may be optical sensors, radio sensors, camera sensors 240, or other sensors that sense a landing state of the UAV 200. Alternatively or additionally, the landing sensors 255 may be contact or pressure sensors that may provide a signal indicating when the UAV 110 has made contact with a surface. In some embodiments, the landing sensors 255 may be adapted to provide the additional ability to charge a battery when the UAV 200 is positioned on a suitable landing pad (not shown), such as through charging connectors. In some embodiments, the landing sensors 255 may provide additional connections with a landing pad, such as wired communication or control connections. The UAV 200 may further include a control unit 210 that may house various circuits and devices used to power and control the operation of the UAV 200, including motors for powering rotors 201, a battery (e.g., power module 250), a communication module (e.g., radio module 230), and so on.

In various embodiments, the UAV 200 may be equipped with a payload-securing unit 207. The payload-securing unit 207 may include an actuator motor that drives a gripping and release mechanism and related controls that are responsive to the control unit 210 to grip and release the payload 209 in response to commands from the control unit 210.

An example of a control unit 210 for the UAV 200 suitable for use with the various embodiments is illustrated in FIG. 2D. With reference to FIGS. 1-2D, the control unit 210 may include a processor 220, a radio module 230, and a power module 250. The processor 220 may include or be coupled to a memory unit 221 and a navigation unit 225. The processor 220 may be configured with processor-executable instructions to control flight and other operations the UAV 200, including operations of the various embodiments. The processor 220 may be coupled to the payload securing unit 207 and the landing sensors 255. The processor 220 may be powered from a power module 250, such as a battery. The processor 220 may be configured with processor-executable instructions to control the charging of the power module 250, such as by executing a charging control algorithm using a charge control circuit. Alternatively or additionally, the power module 250 may be configured to manage its own charging. The processor 220 may be coupled to a motor control unit 223 that is configured to manage the motors that drive the rotors 201.

Through control of the individual motors of the rotors 201, the UAV 200 may be controlled in flight as the UAV 200 progresses toward a destination. In some embodiments, the navigation unit 225 may send data to the processor 220 and use such data to determine the present position and orientation of the UAV 200, as well as the appropriate course towards the destination. In some embodiments, the navigation unit may include a Global Navigation Satellite System (GNSS) receiver system (e.g., one or more Global Positioning System (GPS) receivers) enabling the UAV 200 to navigate using GNSS signals and/or radio navigation receivers for receiving navigation beacon or other signals from radio nodes, such as navigation beacons (e.g., Very High Frequency (VHF) Omni Directional Radio Range (VOR)

beacons), Wi-Fi access points, cellular network sites, radio station, etc. The processor 220 and/or the navigation unit 225 may be additionally configured to communicate with a server (e.g., the server 120) through a wireless connection (e.g., the network 130) to receive data useful in navigation as well as to provide real-time position reports.

An avionics module 229 coupled to the processor 220 and/or the navigation unit 225 may be configured to provide flight control-related information such as altitude, attitude, airspeed, heading, and similar information that the navigation unit 225 may use for navigation purposes, such as dead reckoning between GNSS position updates. The avionics module 229 may include or receive data from a gyro/accelerometer unit 227 that provides data regarding the orientation and accelerations of the UAV 200 that may be used in navigation calculations.

The radio module 230 may be configured to receive navigation signals, such as beacon signals from restricted areas, signals from aviation navigation facilities, etc., and provide such signals to the processor 220 and/or the navigation unit 225 to assist in navigation of the UAV 200. In some embodiments, the navigation unit 225 may use signals received from recognizable (Radio Frequency) RF emitters (e.g., AM/FM radio stations, Wi-Fi access points, cellular network base stations, etc.) on the ground. The locations, unique identifiers, single strengths, frequencies, and other characteristic information of such RF emitters may be stored in a database and used to determine position (e.g., via triangulation and/or trilateration) when RF signals are received by the radio module 230. Such a database of RF emitters may be stored in the memory unit 221 of the UAV 200, in a ground-based server (e.g., the server 120) in communication with the processor 220 via a wireless communication link (e.g., the network 130), or in a combination of the memory unit 221 and a ground-based server. Navigating using information about RF emitters may use any of a number of conventional methods. For example, upon receiving an RF signal via the radio module 230, the processor 220 may obtain the RF signal's unique identifier (e.g., a Service Sector Identification (SSID), a Media Access Control (MAC) address, radio station call sign, cell ID, etc.), and use that information to obtain the ground coordinates and signal strength of the detected RF emitter from the database of RF emitter characteristics. If the database is stored in the onboard memory unit 221, the processor 220 may use the emitter identifier information to perform a table look up in the database. Alternatively or in addition, the processor 220 may use the radio module 230 to transmit the detected RF emitter identifier to a Location Information Service (LIS) server, which may return a location of the RF emitter obtained an RF emitter location database. Using the RF emitters coordinates and optionally the signal strength characteristics, the processor 220 (or the navigation unit 225) may estimate the location of the UAV 200 relative to those coordinates. Using locations of three or more RF emitters detected by the radio module 230, the processor may determine a more precise location via trilateration. Estimates of location based on received ground-based RF emitters may be combined with position information from a GNSS receiver to provide more precise and reliable location estimates than achievable with either method alone.

The processor 220 may use the radio module 230 to conduct wireless communications with a variety of wireless communication wireless communication devices 270 (e.g., the server 120) such as beacon, a server, smartphone, tablet, or other device with which the UAV 200 may be in communication. A bi-directional wireless communication link 232 (corresponding to the network 130) may be established between transmit/receive antenna 231 of the radio module 230 and transmit/receive antenna 271 of the wireless communication device 270. For example, the wireless communication device 270 may be a beacon that controls access to a restricted area as described herein. In an example, the wireless communication device 270 may be a cellular network base station or cell tower. The radio module 230 may be configured to support multiple connections with different wireless communication devices 270 having different radio access technologies. In some embodiments, the wireless communication device 270 may be connected to the server 120 or may provide access to the server 120. In an example, the wireless communication device 270 may be a server of a UAV operator, a third party service (e.g., package delivery, billing, etc.), or an operator of a restricted area. The UAV 200 may communicate with the server 120 through an intermediate communication link such as one or more network nodes or other communication devices. The signals received from or sent to the wireless communication device 270, radio nodes, Wi-Fi access points, cellular network sites, radio station, server, and/or the like may be collectively known wireless control command signals.

In some embodiments, the radio module 230 may be configured to switch between a wireless wide area network and a wireless local area network (or personal area network) connection depending on the location and altitude of the UAV 200. For example, while in flight at an altitude designated for UAV traffic, the radio module 230 may communicate with a cellular infrastructure in order to maintain communications with a server (e.g., 370 or 120). An example of a flight altitude for the UAV 200 may be at around 400 feet or less, such as may be designated by a government authority (e.g., FAA) for UAV flight traffic. At this altitude, it may be difficult to establish communication with some of the wireless communication devices 270 using short-range radio communication links (e.g., Wi-Fi). Therefore, communications with other wireless communication devices 270 may be established using cellular telephone networks while the UAV 200 is at flight altitude. Communication between the radio module 230 and the wireless communication device 270 may transition to a short-range communication link (e.g., Wi-Fi or Bluetooth) when the UAV 200 moves closer to the wireless communication device 270.

The wireless communication device 270 may also be a server (e.g., the server 120) associated with the operator of the UAV 200, which communicates with the UAV 200 through a local access node or through a data connection maintained through a cellular connection. While the various components of the control unit 210 are illustrated as separate components, some or all of the components (e.g., the processor 220, the motor control unit 223, the radio module 230, and other units) may be integrated together in a single device or module, such as a system-on-chip module.

In various embodiments, the processor 220 may be configured to determine the displacement and/or rotation with respect to the motion of the UAV 200. The processor 220 may be coupled to at least one audio transmitter 280 and two or more audio receivers (e.g., a first audio receiver 290, a second audio receiver 295, and the like). The processor 220 may configure the audio transmitter 280 to transmit audio signals with one of more of particular frequency, amplitude, or audio signature. The processor 220 may configure each of the two or more audio receivers 290 and 295 to receive the audio signals transmitted by the audio transmitter 280. The processor 220 may determine reception timestamps associated with the received audio signals. The processor 220 may determine generation or transmittal timestamps associated with the transmitted audio signals. Furthermore, the processor 220 may determine the ToF by computing a difference between the generation timestamp and the reception timestamp for the corresponding audio signals.

According to various embodiments, the displacement and/or rotation determination may be implemented as an alternative to navigation data, flight control-related information, gyro/accelerometer data, navigation signals, or the like determined by other components of the UAV 200.

In other embodiments, the displacement and/or rotation determination may be implemented in addition to or complement one or more of the navigation data, flight control-related information, gyro/accelerometer data, navigation signals, or the like. For example, the displacement and/or rotation data determined according to the embodiments may be used for dead reckoning between GNSS position updates instead of or in addition to the flight control-related information determined by the avionics module 229.

Figure 3:
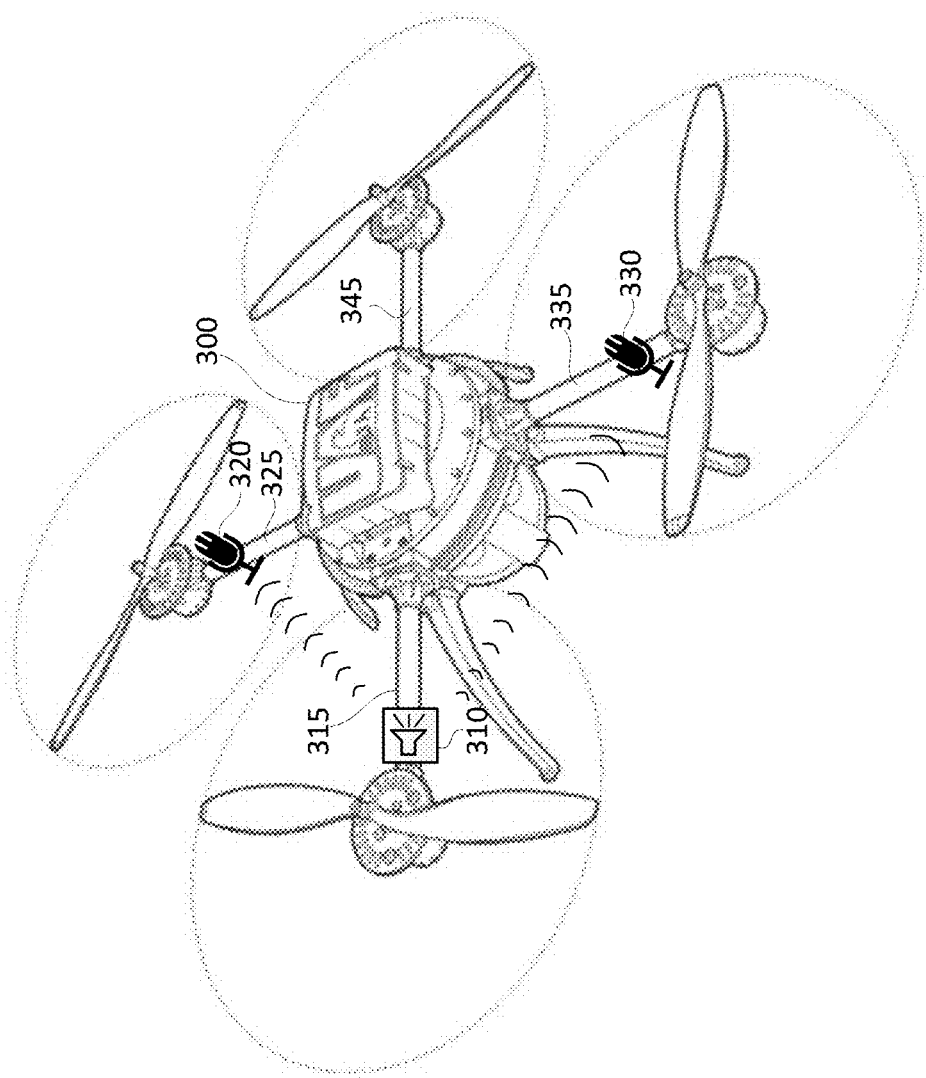
FIG. 3 is a diagram illustrating an example of an audio transmitter/receivers configuration provided on a UAV according to various embodiments.

FIG. 3 is a diagram illustrating an example of an audio transmitter/receiver configuration provided on a UAV 300 according to various embodiments. Referring to FIGS. 1-3, aspects of the UAV 300 may be particular embodiments of the UAVs 110 and 200. The UAV 300 may include a plurality of portions or arms, such as a first arm 315, a second arm 325, a third arm 335, and a fourth arm 345. The first arm 315 (and the fourth arm 345) may be perpendicular to the second arm 325 and third arm 335. The second arm 325 and third arm 335 may be aligned and coaxial. The first arm 315 and fourth arm 345 may be aligned and coaxial.

An audio transmitter 310 (corresponding to the audio transmitter 280) may be arranged on one of the arms, such as the first arm 315. A first audio receiver 320 (corresponding to the first audio receiver 290) and a second audio receiver 330 (corresponding to the second audio receiver 295) may be arranged on the second arm 325 and the third arm 335, respectively.

Additional embodiments of the audio transmitter/receivers configuration may be implemented for the UAVs 110 and 200 so long as the geometric relationship between the at least one audio transmitter 310 and the two or more audio receivers 320 and 330 is known and parameterized. For example, additional embodiments may related to providing an additional audio transmitter or audio receiver on the fourth arm 345 or other any other part of the UAV 300.

In some embodiments, the UAV 300 may include an additional audio transmitter (not shown) configured to generate audio signals with different frequency, amplitude, and/or audio signatures from the audio transmitter 310 so that two or more audio receivers (e.g., the audio receivers 320 and 330) may distinguish two separate audio signal sources and determine the ToF for each accordingly. Correlating results from additional audio transmitter(s) may minimize error and increase confidence level of the displacement measured. The ToF for the additional audio transmitter(s) may be determined in a same manner described with respect to one or more of the audio transmitters 280, 310, 420 (of FIGS. 4A-4E), and/or 520 (of FIG. 5).

Figure 4A:
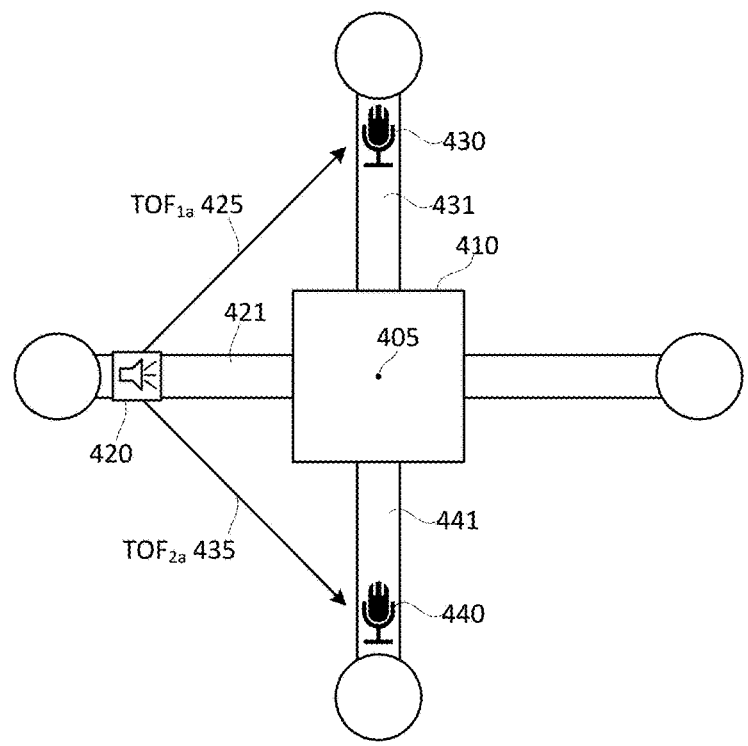
FIG. 4A is a schematic diagram illustrating an example of a UAV in a stationary position according to various embodiments.
Figure 4B:
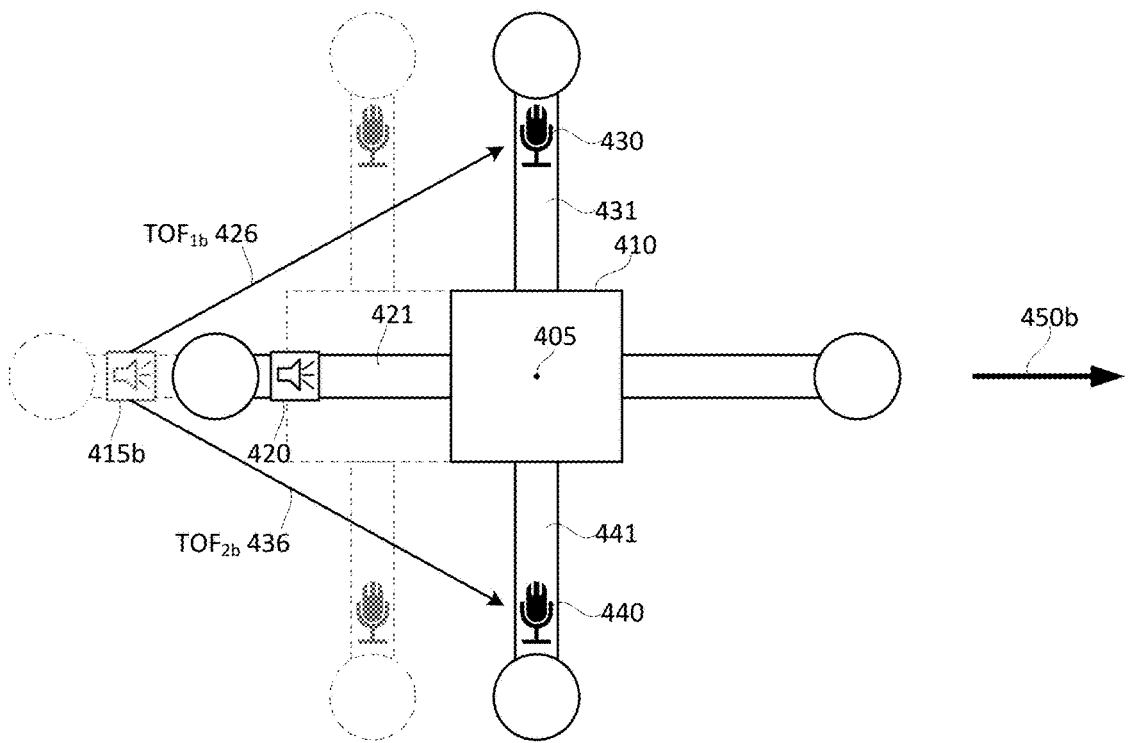
FIG. 4B is a schematic diagram illustrating an example of a UAV moving in a first direction according to various embodiments.
Figure 4C:
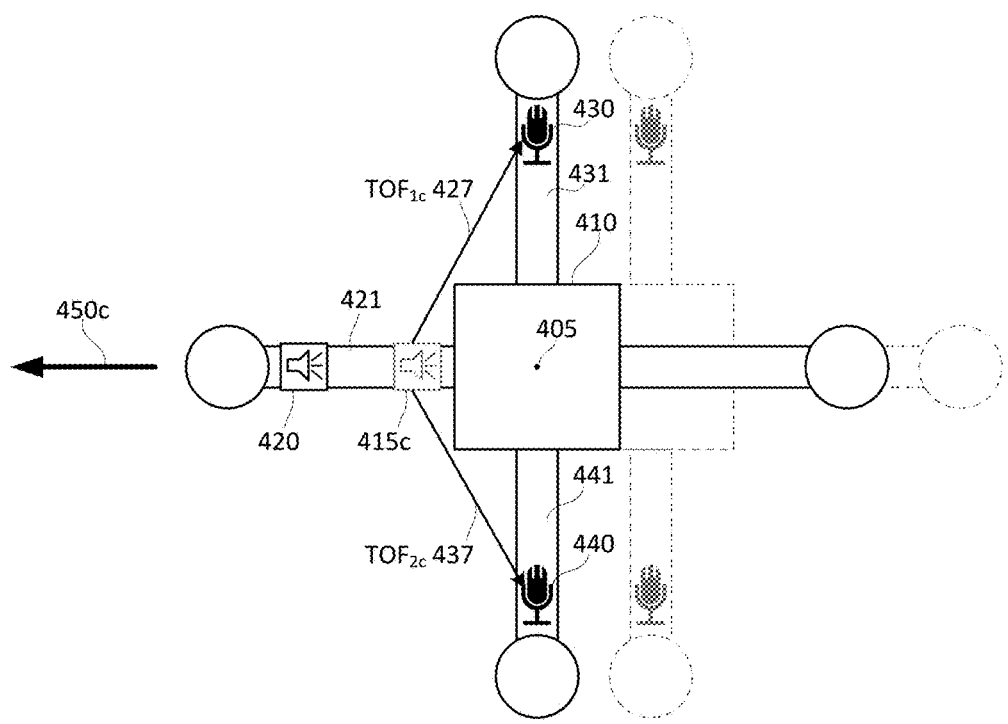
FIG. 4C is a schematic diagram illustrating an example of a UAV moving in a second direction according to various embodiments.

FIG. 4A a schematic diagram illustrating an example of a UAV 410 in a stationary position according to various embodiments. FIG. 4B a schematic diagram illustrating an example of the UAV 410 moving in a first direction 450b according to various embodiments. FIG. 4C a schematic diagram illustrating an example of the UAV 410 moving in a second direction 450c according to various embodiments.

Figure 4E:
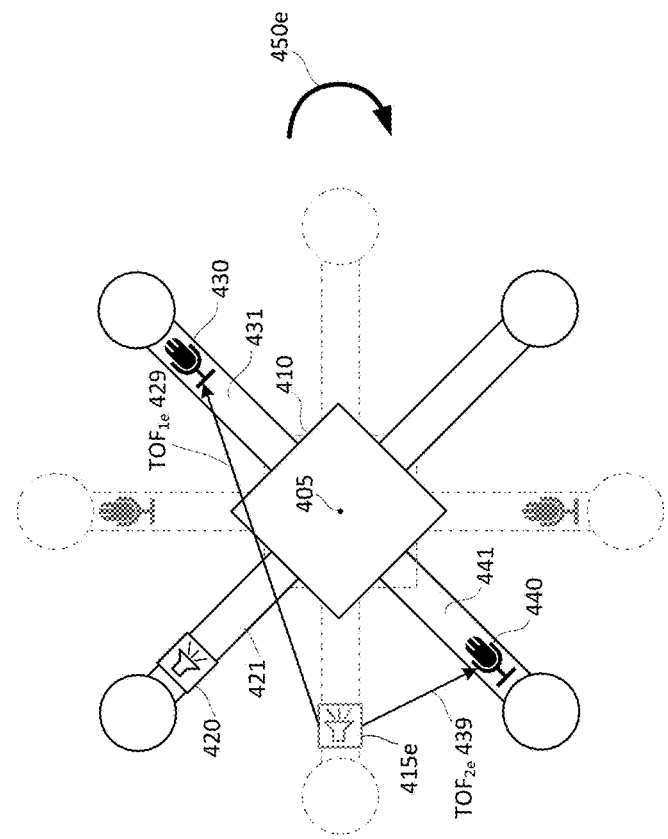
FIG. 4E is a schematic diagram illustrating an example of a UAV rotating in a fourth direction according to various embodiments.
Figure 4D:
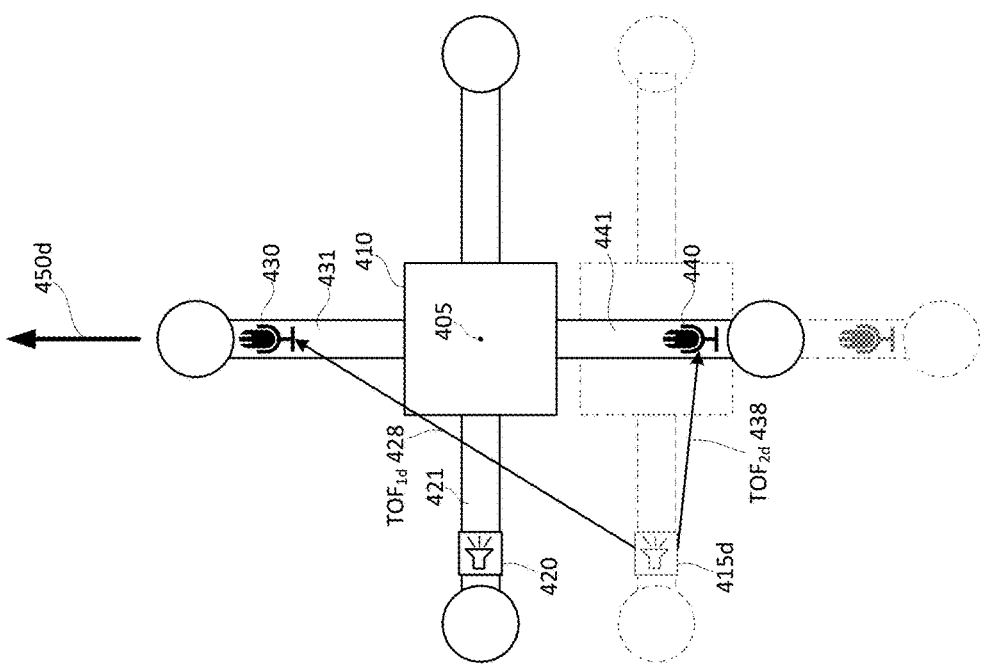
FIG. 4D is a schematic diagram illustrating an example of a UAV moving in a third direction according to various embodiments.

FIG. 4D a schematic diagram illustrating an example of the UAV 410 moving in a third direction 450d according to various embodiments. FIG. 4E is a schematic diagram illustrating an example of the UAV 410 rotating in a fourth direction 450e according to various embodiments.

Referring to FIGS. 1-4E, the UAV 410 may correspond to one or more of the UAV 110, 200, or 300. For example, the UAV 410 may correspond to the audio transmitter/receivers configuration provided to the UAV 300. Particularly, an audio transmitter 420 may correspond to the audio transmitter 310. A first audio receiver 430 may correspond to the first audio receiver 320. A second audio receiver 440 may correspond to the second audio receiver 330. The audio transmitter 420 may be arranged on a first arm 421 (which corresponds to the first arm 315). The first and second audio receivers 430 and 440 may be arranged on a second arm 431 (which corresponds to the second arm 325) and a third arm 441 (which corresponds to the third arm 335), respectively. The first arm 421 may be perpendicular to the second and third arms 431 and 441. The second and third arms 431 and 441 may be coaxial or otherwise aligned (forming a straight angle).

While the UAV 410 is stationary or hovering in place (e.g., as shown in FIG. 4A), the UAV 410 (e.g., processor 220) may be configured to perform a calibration process. The audio transmitter 420 may transmit audio signals (e.g., ultrasound signals) which can be received by the first and second audio receivers 430 and 440.

A first time of flight ($ToF_{1a}$) 425 may be the time it takes the audio signals transmitted from the audio transmitter 420 to reach the first audio receiver 430. $ToF_{1a}$ 425 may be a time difference between a generation timestamp corresponding to transmission of the audio signals by the audio transmitter 420 and a reception timestamp corresponding to reception of the same audio signals at the first audio receiver 430. A second time of flight ($ToF_{2a}$) 435 may be the time it takes the audio signals transmitted from the audio transmitter 420 to reach the second audio receiver 440. $ToF_{2a}$ 435 may be a time difference between the generation timestamp corresponding to transmission of the audio signals by the audio transmitter 420 and a reception timestamp corresponding to reception of the same audio signals at the second audio receiver 440.

$ToF_{1a}$ 425 and $ToF_{2a}$ 435 may be established as the baseline ToF for each of the first audio receiver 430 and the second audio receiver 440, respectively. The baseline ToFs may account for errors, fluctuations, audio signals propagation medium (e.g., content of the air in which the UAV 410 is flying in), and the like. A set of baseline ToFs may be established for a given range of altitudes. As the content of air may vary based on altitude, a new set of baseline ToFs may be established when a new altitude range has been reached by the UAV 410. For example, when the avionic module 229 determines that the altitude of the UAV 410 is within a predetermined range, the processor 220 may configure the UAV 200 to hover in place to determine a new set of baseline ToFs (e.g., $ToF_{1a}$ 425 and $ToF_{2a}$ 435). In addition or alternatively, a set of baseline ToFs may be established for various other conditions including (but not limited to) temperature, humidity, weather conditions, time of day, location, etc.

While the UAV 410 is moving in the first direction 450b, the audio transmitter 420 may transmit audio signals (e.g., ultrasound signals) which can be received by the first and second audio receivers 430 and 440. When the audio signals are generated (transmitted) by the audio transmitter 420 (at the generation timestamp), the audio transmitter 420 may be at an original location 415b (UAV is at a first location).

When both of the audio receivers 430 and 440 have received the audio signals, the audio transmitter 420 as well as the UAV 410 as a whole may be in a second location, having moved in the first direction 450*b*.

A first time of flight (ToF$_{1b}$) 426 may be the time it takes the audio signals transmitted from the audio transmitter 420 in the original location 415*b* to be received by the first audio receiver 430. ToF$_{1b}$ 426 may be a time difference between a generation timestamp corresponding to transmission of the audio signals by the audio transmitter 420 and a reception timestamp corresponding to reception of the same audio signals at the first audio receiver 430. A second time of flight (ToF$_{2b}$) 436 may be the time it takes the audio signals transmitted from the audio transmitter 420 in the original location 415*b* to be received by the second audio receiver 440. ToF$_{2b}$ 436 may be a time difference between the generation timestamp corresponding to transmission of the audio signals by the audio transmitter 420 and a reception timestamp corresponding to reception of the same audio signals at the second audio receiver 440.

Given that both the first and second audio receivers 430 and 440 are moving away from the original location 415*b* of the audio transmitter 420, the distances for the audio signals to travel to reach the first and second audio receivers 430 and 440 may be lengthened. Thus, increased ToFs (e.g., increased ToF$_{1b}$ 426 and ToF$_{2b}$ 436) may be observed. Particularly, ToF$_{1b}$ 426 may be larger than the baseline ToF$_{1a}$ 425 proportional to the velocity of the UAV 110. Similarly, ToF$_{2b}$ 436 may be larger than the baseline ToF$_{2a}$ 435 proportional to the velocity of the UAV 110. In this particular configuration, ToF$_{1b}$ 426 may equal to ToF$_{2b}$ 436 when the first audio receiver 430 and the second audio receiver 440 are equidistant from a center point 405 and/or the audio transmitter 420. The center point 405 may lie, for example, along the axis defining the second and third arms 431 and 441. The center point 405 may also lie on an axis defining the first arm 421.

In various embodiments, the first direction 450*b* may be along a same axis as the first arm 421. The first direction 450*b* may be perpendicular to the second and third arms 431 and 441. In other embodiments, the first direction 450*b* may be along another suitable axis different from an axis on which any of the arms (421, 431, 441, and/or the like) lie. For instance, the first direction 450*b* may extend from the center point 405 of the UAV 410 at a 45-degree angle (or any other angle) with respect to at least one (e.g., the second arm 431 and the fourth arm) of the arms.

While the UAV 410 is moving in the second direction 450*c*, the audio transmitter 420 may transmit audio signals (e.g., ultrasound signals) which can be received by the first and second audio receivers 430 and 440. When the audio signals are generated (transmitted) by the audio transmitter 420 (at the generation timestamp), the audio transmitter 420 may be at an original location 415*c* (UAV is at a first location). When both of the audio receivers 430 and 440 have received the audio signals, the audio transmitter 420 as well as the UAV 410 as a whole may be in a second location, having moved in the second direction 450*c*.

A first time of flight (ToF$_{1c}$) 427 may be the time it takes the audio signals transmitted from the audio transmitter 420 in the original location 415*c* to be received by the first audio receiver 430. ToF$_{1c}$ 427 may be a time difference between a generation timestamp corresponding to transmission of the audio signals by the audio transmitter 420 and a reception timestamp corresponding to reception of the same audio signals at the first audio receiver 430. A second time of flight (ToF$_{2c}$) 437 may be the time it takes the audio signals transmitted from the audio transmitter 420 in the original location 415*c* to be received by the second audio receiver 440. ToF$_{2c}$ 437 may be a time difference between the generation timestamp corresponding to transmission of the audio signals by the audio transmitter 420 and a reception timestamp corresponding to reception of the same audio signals at the second audio receiver 440.

Given that both the first and second audio receivers 430 and 440 are moving toward the original location 415*c* of the audio transmitter 420, the distances for the audio signals to travel to reach the first and second audio receiver 430 and 440 may be shortened. Thus, decreased ToFs (e.g., decreased ToF$_{1c}$ 427 and ToF$_{2c}$ 437) may be observed. Particularly, ToF$_{1c}$ 427 may be lesser than the baseline ToF$_{1a}$ 425 proportional to the velocity of the UAV 110. In addition or alternatively, ToF$_{2c}$ 437 may be lesser than the baseline ToF$_{2a}$ 435 proportional to the velocity of the UAV 110. In this particular configuration, ToF$_{1c}$ 427 may equal to ToF$_{2c}$ 437 when the first audio receiver 430 and the second audio receiver 440 are equidistant from a center point 405 and/or the audio transmitter 420.

In various embodiments, the second direction 450*c* may be along a same axis as the first arm 421. The second direction 450*c* may be perpendicular to the second and third arms 431 and 441. In other embodiments, the second direction 450*c* may be along another suitable axis different from an axis on which any of the arms (421, 431, 441, and/or the like) lie. For instance, the second direction 450*c* may extend from the center point 405 of the UAV 410 at a 45-degree angle (or any other angle) with respect to at least one (e.g., the second arm 431 and the third arm 441) of the arms.

While the UAV 410 is moving in the third direction 450*d*, the audio transmitter 420 may transmit audio signals (e.g., ultrasound signals) which can be received by the first and second audio receivers 430 and 440. When the audio signals are generated (transmitted) by the audio transmitter 420 (at the generation timestamp), the audio transmitter 420 may be at an original location 415*d* (UAV is at a first location). When both of the audio receivers 430 and 440 have received the audio signals, the audio transmitter 420 as well as the UAV 410 as a whole may be in the a second location, having moved in the third direction 450*d*.

A first time of flight (ToF$_{1d}$) 428 may be the time it takes the audio signals transmitted from the audio transmitter 420 in the original location 415*d* to be received by the first audio receiver 430. ToF$_{1d}$ 428 may be a time difference between a generation timestamp corresponding to transmission of the audio signals by the audio transmitter 420 and a reception timestamp corresponding to reception of the same audio signals at the first audio receiver 430. A second time of flight (ToF$_{2d}$) 438 may be the time it takes the audio signals transmitted from the audio transmitter 420 in the original location 415*d* to be received by the second audio receiver 440. ToF$_{2d}$ 438 may be a time difference between the generation timestamp corresponding to transmission of the audio signals by the audio transmitter 420 and a reception timestamp corresponding to reception of the same audio signals at the second audio receiver 440.

Given that the first audio receiver 430 may be moving away from the original location 415*d* and the second audio receiver 440 is moving toward the original location 415*d*, the distance for the audio signals to travel to reach the first audio receiver 430 may be increased while the distance for the same audio signals to travel to reach the second audio receiver 440 may be decreased. Thus, ToF$_{1d}$ 428 may be greater than the baseline ToF$_{1a}$ 425 proportional to the velocity of the UAV 110. In addition or alternatively, ToF$_{2d}$ 438 may be lesser than the baseline $\text{ToF}_{2a}$ 435 proportional to the velocity of the UAV 110. In this particular configuration, $\text{ToF}_{1d}$ 428 may be different from $\text{ToF}_{2d}$ 438 by virtue of the third direction 450d.

In various embodiments, the third direction 450d may be along a same axis as the second arm 431 and/or the third arm 441. The third direction 450d may be perpendicular to the first arm 421. In other embodiments, the third direction 450d may be along another suitable axis different from an axis on which any of the arms (421, 431, 441, and/or the like) lie. For instance, the third direction 450d may extend from the center point 405 of the UAV 410 at a 45-degree angle (or any other angle) with respect to at least one (e.g., the first arm 421, the second arm 431, and the fourth arm 441) of the arms.

While the UAV 410 is rotating about the center point 405 in the fourth direction 450e (a clockwise direction), the audio transmitter 420 may transmit audio signals (e.g., ultrasound signals) which can be received by the first and second audio receivers 430 and 440. When the audio signals are generated (transmitted) by the audio transmitter 420 (at the generation timestamp), the audio transmitter 420 may be at an original location 415e (UAV is at a first location). When both of the audio receivers 430 and 440 have received the audio signals, the audio transmitter 420 as well as the UAV 410 as a whole may be in a second location, having rotated in the fourth direction 450e.

A first time of flight ($\text{ToF}_{1e}$) 429 may be the time it takes the audio signals transmitted from the audio transmitter 420 in the original location 415e to be received by the first audio receiver 430. $\text{ToF}_{1e}$ 429 may be a time difference between a generation timestamp corresponding to transmission of the audio signals by the audio transmitter 420 and a reception timestamp corresponding to reception of the same audio signals at the first audio receiver 430. A second time of flight ($\text{ToF}_{2e}$) 439 may be the time it takes the audio signals transmitted from the audio transmitter 420 in the original location 415e to be received by the second audio receiver 440. $\text{ToF}_{2e}$ 439 may be a time difference between the generation timestamp corresponding to transmission of the audio signals by the audio transmitter 420 and a reception timestamp corresponding to reception of the same audio signals at the second audio receiver 440.

Given that the first audio receiver 430 is moving away from the original location 415e and the second audio receiver 440 is moving toward the original location 415e, the distance for the audio signals to travel to reach the first audio receiver 430 may be increased while the distance for the audio signals to travel to reach the second audio receiver 440 may be decreased. Thus, $\text{ToF}_{1e}$ 429 may be greater than the baseline $\text{ToF}_{1a}$ 425 proportional to the angular velocity and geometry of the UAV 110. In addition or alternatively, $\text{ToF}_{2e}$ 439 may be lesser than the baseline $\text{ToF}_{2a}$ 435 proportional to the angular velocity and geometry of the UAV 110. In this particular configuration, $\text{ToF}_{1e}$ 429 may be different from $\text{ToF}_{2e}$ 439 by virtue of the rotation.

Figure 5:
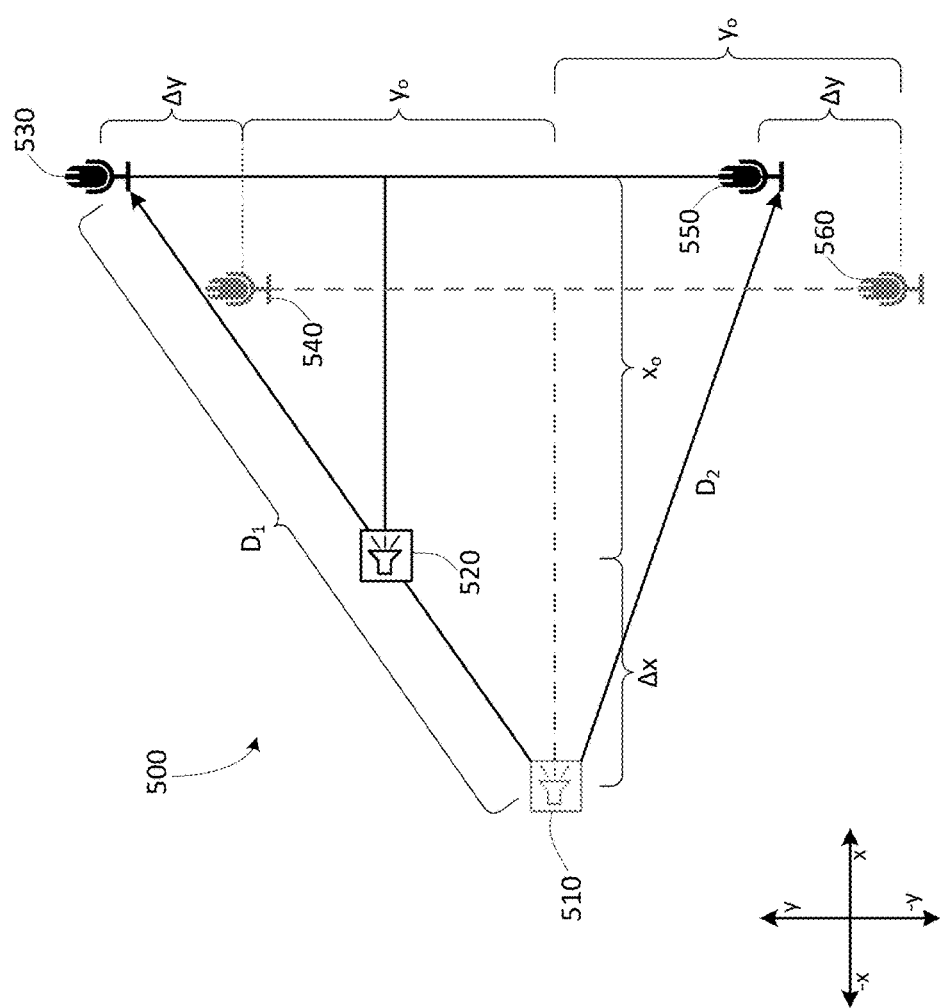
FIG. 5 is a schematic diagram illustrating an example of displacement determination for a UAV implementing some embodiments of the audio transmitter/receivers configurations.

FIG. 5 is a schematic diagram illustrating an example of displacement determination 500 for one or more of the UAV 110, 200, 300, or 410 implementing some embodiments of the audio transmitter/receivers configurations. Referring to FIGS. 1-5, the manner in which the displacement can be determined may depend on the structural configuration of the at least one audio transmitter (e.g., one or more of audio transmitter 280, 310, or 420) and the two or more audio receivers (e.g., audio receivers 290, 295; 320, 330; or 430, 440). The displacement determination 500 may correspond to the non-limiting examples of the audio transmitter/receivers configurations shown with respect to the UAVs 300 and/or 410.

With respect to either a first audio receiver 530 (corresponding to one or more of the first audio receivers 320 and 430) and a second audio receiver 550 (corresponding to one or more of the second audio receivers 330 and 440), the direction of $\Delta x$ (i.e., the operating sign of $\Delta x$) may be consistent (i.e., the same). For example, when the UAV moves in a direction having at least a component in x-direction (e.g., the first direction 450b), a positive $\Delta x$ may be associated with both the first audio receiver 530 and the second audio receiver 550. When the UAV moves in a direction having at least a component in the $-x$-direction (e.g., the second direction 450c), a negative $\Delta x$ may apply to both the first audio receiver 530 and the second audio receiver 550.

On the other hand, with respect the first audio receiver 530 and the second audio receiver 550, the direction of $\Delta y$ (i.e., the operating sign of $\Delta y$) may be inconsistent (i.e., the opposite). For example, when the UAV moves in a direction having at least a component in y-direction (e.g., the third direction 450d), a positive $\Delta y$ may apply to only the first audio receiver 530 and a negative $\Delta y$ (of same magnitude) may apply to the second audio receiver 550. When the UAV moves in a direction having at least a component in the $-y$-direction (e.g., opposite the third direction 450d), a negative $\Delta y$ may apply to the first audio receiver 530 and a positive $\Delta y$ may apply to the second audio receiver 550.

Based on the observation above, the displacement of the UAV with respect to this non-limiting configuration can be characterized as:

$$\text{ToF}_1^2(V_{us})^2 = (\Delta x + x_0)^2 + (\Delta y + y_0)^2 \qquad (1)$$

$$\text{ToF}_2^2(V_{us})^2 = (\Delta x + x_0)^2 + (-\Delta y + y_0)^2 \qquad (2)$$

where $\Delta x$ and $\Delta y$ are to be determined as the displacement. In some embodiments, $y_o$ may be a distance from a midpoint (e.g., the center point 405) between the first and second audio receivers 530 and 550 of the UAV. $x_o$ may be a distance from the midpoint to the audio transmitter 520. $\Delta x$ and $\Delta y$ may represent the displacement of the UAV. $V_{us}$ may be the known velocity (e.g., 331 m/s for ultrasound in air) of the audio signals. $\text{ToF}_1$ may be the ToF associated with the first audio receiver 530. Examples of $\text{ToF}_1$ may include, but are not limited to, $\text{ToF}_{1b}$ 426, $\text{ToF}_{1c}$ 427, $\text{ToF}_{1d}$ 428, $\text{ToF}_{1e}$ 429, and the like. $\text{ToF}_2$ may be the ToF associated with the second audio receiver 550. Examples of $\text{ToF}_2$ may include, but are not limited to, $\text{ToF}_{2b}$ 436, $\text{ToF}_{2c}$ 437, $\text{ToF}_{2d}$ 438, $\text{ToF}_{2e}$ 439, and the like. A product of $\text{ToF}_1$ and $V_{us}$ may be a distance D1. A product of $\text{ToF}_2$ and $V_{us}$ may be a distance D2. In various embodiments, each of the ToFs and $V_{us}$ may be adjusted for error, fluctuation, propagation medium, and the like based on the calibrated baseline ToFs (e.g., $\text{ToF}_{1a}$ 425 and $\text{ToF}_{2a}$ 435).

Figure 6:
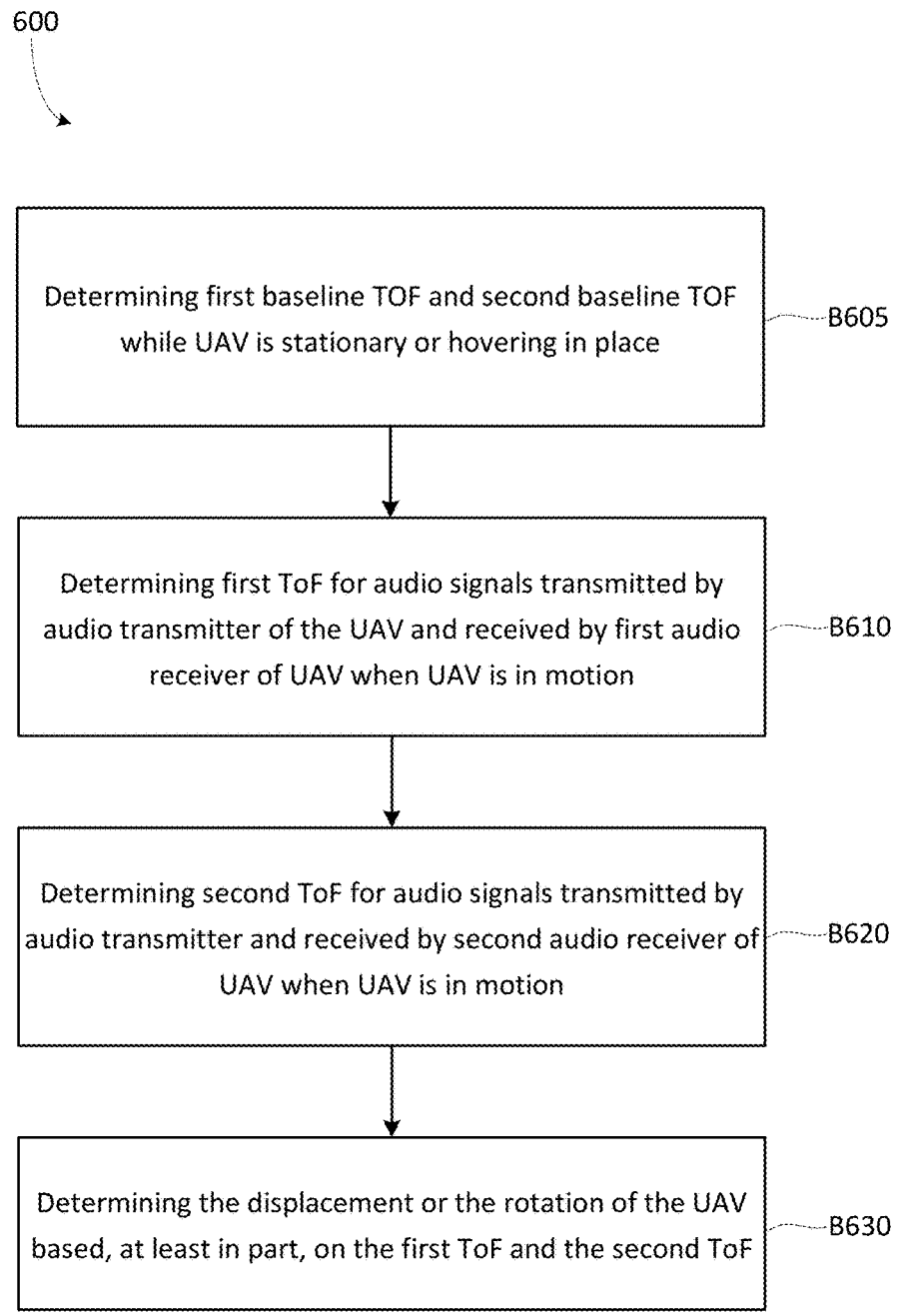
FIG. 6 is a process flow diagram illustrating an example of a UAV displacement and/or rotation determination method according to various embodiments.

FIG. 6 is a process flow diagram illustrating an example of a UAV displacement and/or rotation determination method 600 according to various embodiments. Referring to FIGS. 1-6, the displacement and/or rotation determination method 600 may be performed by the processor 220 (and/or other components of the control unit 210) of a UAV (e.g., 110, 200, 300, 410, or the like) according to various embodiments.

At block B605, a first baseline ToF (e.g., $\text{ToF}_{1a}$ 425) and a second baseline ToF (e.g., $\text{ToF}_{2a}$ 435) may be determined while the UAV 200 is stationary or hovering in place at a given altitude.

At block B610, the processor 220 may determine a first ToF for audio signals transmitted by the audio transmitter 280 of the UAV 200 and received by first audio receiver 290 of the UAV 200 while the UAV 200 is in motion. The audio transmitter 280 may correspond to one or more of the audio transmitters 310, 420, and/or 510. The first audio receiver 290 may correspond to one or more of the first audio receivers 320, 430, and/or 530. The first ToF may refer to $ToF_1$ in equation (1). Examples of the first ToF may include, but are not limited to, $ToF_{1b}$ 426, $ToF_{1c}$ 427, $ToF_{1d}$ 428, $ToF_{1e}$ 429, and the like. The first ToF may be adjusted based on the first baseline ToF in the manner described.

At block B620, the processor 220 may determine a second ToF for audio signals transmitted by the audio transmitter 280 and received by the second audio receiver 295 of the UAV 200 while UAV 200 is in motion. The second audio receiver 295 may correspond to one or more of the second audio receivers 330, 440, and/or 550. The second ToF may refer to $ToF_2$ in equation (2). Examples of the second ToF may include, but are not limited to, $ToF_{2b}$ 436, $ToF_{2c}$ 437, $ToF_{2d}$ 438, $ToF_{2e}$ 439, and the like. The second ToF may be adjusted based on the second baseline ToF in the manner described.

In some embodiments, the processor 220 may configure the audio transmitter 280 to transmit the audio signals (e.g., ultrasound signals) periodically with at least one detectable characteristic (e.g., amplitude, frequency, audio signature, or the like). For example, the processor 220 may configure the audio transmitter 280 to pulse audio signals at a frequency and noting the generation timestamp for (a peak of) each pulse. Based on the first baseline ToF and the second baseline ToF, an acceptable range of reception timestamps may be determined for each of the first audio receiver 290 and the second audio receiver 295. For example, given that the first ToF (and the second ToF) may be greater than or less than the first baseline ToF (and the second baseline ToF), the acceptable range may be an interval with a mean or approximate mean of generation time stamp plus time indicated by the first baseline ToF (for the first audio receiver 290) or the second baseline ToF (for the second audio receiver 295).

The length of the range may depend on the top and bottom speeds of the UAV 200 as well as the distance between the audio transmitter 280 and each of the first and second audio receivers 290 and 295. Particularly, the top and bottom speeds of the UAV 200 may affect the value and length of the range in that a UAV that is travelling at a faster speed may experience more deviation from the baseline ToFs, vice versa. In addition, the longer the distance between the audio transmitter 280 and an audio receiver (e.g., one of 290 or 295), the more impact the speed of the UAV 200 may have on the ToF measured while the UAV 200 is in motion.

Accordingly, reception timestamps determined to be within the range associated with the generation timestamp may be grouped with the generation timestamp to determine the ToF. The reception timestamp may be determined when correlation is found between the received audio signals and the transmitted audio signals by correlating, comparing, or otherwise matching the received audio signals with the known amplitude, frequency, or audio signature of the transmitted audio signals.

Illustrating with a non-limiting example, the processor 220 may configure the audio transmitter 280 to pulse ultrasound signals at a given peak frequency at a generation timestamp ($T_1$). The acceptable range for the first ToF may be a range center on $T_1+ToF_{1a}$ 425. When audio signals received by the first audio receiver 290 during the range exhibit a frequency peak equal to or within an acceptable variation of the given frequency, the reception timestamp may be recorded. The first ToF may be the reception timestamp minus the generation timestamp.

At block B630, the processor 220 may be configured to determine the displacement and/or the rotation of the UAV 200 based, at least in part, on the first ToF and the second ToF in the manner described.

Additional embodiments may employ at least one additional audio transmitter or at least one additional audio receiver to further increase accuracy of the determination. For example, an additional audio transmitter (not shown) other than the audio transmitter 280 may be provided to transmit second audio signals having one or more of frequency, amplitude, or audio signature different from the frequency, amplitude, or audio signature of the first audio signals to distinguish themselves from the first audio signals.

The first audio receiver 290 may be further configured to receive the second audio signals, for which the processor 220 may determine a third ToF. In addition or alternatively, the second audio receiver 295 may be further configured to receive the second audio signals for which the processor 220 may determine a fourth ToF. The processor 220 may then determine the displacement or the rotation of the UAV 200 based, at least in part, on the third ToF and the fourth ToF in addition to the first and second ToF.

In further embodiments, an additional (third) audio receiver (not shown) other than the first audio receiver 290 and the second audio receiver 295 may be provided to the UAV 200 to receive the first audio signals for which the processor 220 may determine a ToF separate from the first and second ToFs. The processor 220 may then determine the displacement or the rotation of the UAV 200 based, at least in part, on the first ToF, the second ToF, and the third ToF.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for determining a displacement or a rotation of an Unmanned Aerial Vehicle (UAV), the method comprising:
   determining a first Time of Flight (ToF) of audio signals transmitted from an audio transmitter of the UAV directly to a first audio receiver of the same UAV while the UAV is in motion;
   determining a second ToF of audio signals transmitted from the audio transmitter directly to a second audio receiver of the same UAV while the UAV is in motion; and
   determining the displacement or the rotation of the UAV based, at least in part, on the first ToF and the second ToF, wherein the displacement or the rotation of the UAV is determined independently of any signals transmitted by either the first audio receiver or the second audio receiver to the audio transmitter.

2. The method of claim 1, further comprising:
   determining a first baseline ToF of audio signals transmitted by the audio transmitter and received by the first audio receiver while the UAV is stationary or hovering in place; and
   determining a second baseline ToF of the audio signals transmitted by the audio transmitter and received by the second audio receiver while the UAV is stationary or hovering in place.

3. The method of claim 2, further comprising:
   adjusting the first ToF based on the first baseline ToF; and
   adjusting the second ToF based on the second baseline ToF.

4. The method of claim 2, wherein the displacement or the rotation of the UAV is determined based, at least in part, on one or both of:
   comparing the first ToF with the first baseline ToF; and
   comparing the second ToF with the second baseline ToF.

5. The method of claim 4, wherein the displacement of the UAV is determined to be in a first direction based on the first ToF being greater than the first baseline ToF, the first direction corresponding to movement of the first audio receiver away from an original position of the audio transmitter.

6. The method of claim 4, wherein the displacement of the UAV is determined to be in a second direction based on the second ToF being less than the second baseline ToF, the second direction corresponding to movement of the second audio receiver toward an original position of the audio transmitter.

7. The method of claim 1, further comprising:
   determining the first ToF based on a generation timestamp corresponding to when the audio signals are transmitted from the audio transmitter and a first reception timestamp corresponding to when the audio signals are received by the first audio receiver; and
   determining the second ToF based on the generation timestamp and a second reception timestamp corresponding to when the audio signals are received by the second audio receiver.

8. The method of claim 7, wherein the audio signals are transmitted with one or more of a particular frequency, amplitude, or audio signature.

9. The method of claim 8, further comprising:
   determining the first reception timestamp by comparing one or more of the particular frequency, amplitude, or audio signature with one or more of a frequency, amplitude, or audio signature associated with the audio signals as received by the first audio receiver; and determining the second reception timestamp by comparing one or more of the particular frequency, amplitude, or audio signature with one or more of a frequency, amplitude, or audio signature associated with the audio signals as received by the second audio receiver.

10. The method of claim 1, wherein the audio signals are ultrasound signals.

11. The method of claim 1, wherein the first audio receiver and the second audio receiver are spaced apart on the UAV.

12. The method of claim 1, wherein:
the audio transmitter is provided on a first portion of the UAV;
the first audio receiver is provided on a second portion of the UAV; and
the second audio receiver is provided on a third portion of the UAV, wherein the first portion, the second portion, and the third portion of the UAV are separate portions of the UAV.

13. The method of claim 12, wherein the first audio receiver and the second audio receiver are equidistant from the audio transmitter.

14. The method of claim 12 wherein:
the first portion is a first arm of the UAV;
the second portion is a second arm of the UAV; and
the third portion is a third arm of the UAV.

15. The method of claim 14, wherein the first arm is perpendicular to one or more of the first arm or the second arm.

16. An Unmanned Aerial Vehicle (UAV) configured to determine a displacement or a rotation of the UAV, comprising:
an audio transmitter;
a first audio receiver;
a second audio receiver;
one or more processors; and
a memory storing instructions that, when executed by the one or more processors, cause the UAV to:
determine a first Time of Flight (ToF) of audio signals transmitted from the audio transmitter directly to the first audio receiver of the same UAV while the UAV is in motion;
determine a second ToF of audio signals transmitted from the audio transmitter directly to the second audio receiver of the same UAV while the UAV is in motion; and
determine the displacement or the rotation of the UAV based, at least in part, on the first ToF and the second ToF, wherein the displacement or the rotation of the UAV is determined independently of any signals transmitted by either the first audio receiver or the second audio receiver to the audio transmitter.

17. The UAV of claim 16, wherein execution of the instructions further causes the UAV to:
determine a first baseline ToF of audio signals transmitted from the audio transmitter and received by the first audio receiver while the UAV is stationary or hovering in place; and
determine a second baseline ToF of the audio signals transmitted from the audio transmitter and received by the second audio receiver while the UAV is stationary or hovering in place.

18. The UAV of claim 17, wherein execution of the instructions further causes the UAV to:
adjust the first ToF based on the first baseline ToF; and
adjust the second ToF based on the second baseline ToF.

19. The UAV of claim 17, wherein execution of the instructions further causes the UAV to:
compare the first ToF with the first baseline ToF; and
compare the second ToF with the second baseline ToF.

20. The UAV of claim 19, wherein the displacement of the UAV is determined to be in a first direction based on the first ToF being greater than the first baseline ToF, the first direction corresponding to movement of the first audio receiver away from an original position of the audio transmitter.

21. The UAV of claim 19, wherein the displacement of the UAV is determined to be in a second direction based on the second ToF being less than the second baseline ToF, the second direction corresponding to movement of the second audio receiver toward the original position of the audio transmitter.

22. The UAV of claim 16, wherein execution of the instructions further causes the UAV to:
determine the first ToF based on a generation timestamp corresponding to when the audio signals are transmitted from the audio transmitter and a first reception timestamp corresponding to when the audio signals are received by the first audio receiver; and
determine the second ToF based on the generation timestamp and a second reception timestamp corresponding to when the audio signals are received by the second audio receiver.

23. The UAV of claim 22, wherein execution of the instructions further causes the UAV to transmit the audio signals with one or more of a particular frequency, amplitude, or audio signature.

24. The UAV of claim 23, wherein execution of the instructions further causes the UAV to:
determine the first reception timestamp by comparing one or more of the particular frequency, amplitude, or audio signature with one or more of a frequency, amplitude, or audio signature associated with the audio signals as received by the first audio receiver; and
determine the second reception timestamp by comparing one or more of the particular frequency, amplitude, or audio signature with one or more of a frequency, amplitude, or audio signature associated with the audio signals as received by the second audio receiver.

25. The UAV of the claim 16, wherein the audio signals are ultrasound signals.

26. The UAV of the claim 16, wherein the first audio receiver and the second audio receiver are spaced apart on the UAV.

27. The UAV of the claim 16, wherein:
the audio transmitter is arranged on a first portion of the UAV;
the first audio receiver is arranged on a second portion of the UAV; and
the second audio receiver is arranged on a third portion of the UAV, wherein the first portion, the second portion, and the third portion of the UAV are separate portions of the UAV.

28. The UAV of the claim 27, wherein:
the first portion is a first arm of the UAV;
the second portion is a second arm of the UAV; and
the third portion is a third arm of the UAV.

29. A non-transitory computer-readable medium comprising instructions that, when executed by one or more processors of an Unmanned Aerial Vehicle (UAV), cause the UAV to determine a displacement or a rotation of the UAV by performing operations comprising:

determining a first Time of Flight (ToF) of audio signals transmitted from an audio transmitter of the UAV directly to a first audio receiver of the same UAV when the UAV is in motion;

determining a second ToF of audio signals transmitted from the audio transmitter directly to a second audio receiver of the same UAV when the UAV is in motion; and determining the displacement or the rotation of the UAV based, at least in part, on the first ToF and the second ToF, wherein the displacement or the rotation of the UAV is determined independently of any signals transmitted by either the first audio receiver or the second audio receiver to the audio transmitter.

30. An Unmanned Aerial Vehicle (UAV) configured to determine a displacement or a rotation of the UAV, comprising:

means for transmitting audio signals;

first means for receiving the audio signals;

second means for receiving the audio signals;

means for determining a first Time of Flight (ToF) of audio signals transmitted from the means for transmitting directly to the first means for receiving of the same UAV, while the UAV is in motion;

means for determining a second ToF for the audio signals transmitted by the means for transmitting the audio signals, and received by the second means for receiving the audio signals of the same UAV, while the UAV is in motion; and means for determining the displacement or the rotation of the UAV based, at least in part, on the first ToF and the second ToF, wherein the displacement or the rotation of the UAV is determined independently of any signals transmitted by either the first audio receiver or the second audio receiver to the audio transmitter.

* * * * *